(12) United States Patent
Fukuda

(10) Patent No.: US 7,489,728 B2
(45) Date of Patent: Feb. 10, 2009

(54) APPARATUS AND METHOD FOR CODING MOVING IMAGE

(75) Inventor: Michiko Fukuda, Tokyo (JP)

(73) Assignee: NEC Corporation, Tokyo (JP)

( * ) Notice: Subject to any disclaimer, the term of this patent is extended or adjusted under 35 U.S.C. 154(b) by 760 days.

(21) Appl. No.: 10/452,277

(22) Filed: Jun. 3, 2003

(65) Prior Publication Data

US 2003/0227972 A1 Dec. 11, 2003

(30) Foreign Application Priority Data

Jun. 7, 2002 (JP) .............................. 2002-167185

(51) Int. Cl.
*H04N 7/12* (2006.01)
*H04N 11/02* (2006.01)
*H04N 11/04* (2006.01)
*H04B 1/66* (2006.01)

(52) U.S. Cl. ................................. 375/240.12
(58) Field of Classification Search ........................ None
See application file for complete search history.

(56) References Cited

U.S. PATENT DOCUMENTS

| 5,060,480 A | * | 10/1991 | Saulnier ...................... 62/616 |
| 5,666,162 A | | 9/1997 | Iizuka |
| 5,825,425 A | * | 10/1998 | Kazui et al. ............ 375/240.24 |
| 5,835,931 A | * | 11/1998 | Brandt et al. ................... 711/5 |
| 6,049,632 A | * | 4/2000 | Cockshott et al. ........... 382/239 |
| 6,188,792 B1 | * | 2/2001 | Chujoh et al. ............... 382/236 |
| 7,027,054 B1 | * | 4/2006 | Cheiky et al. ............... 345/473 |

FOREIGN PATENT DOCUMENTS

| JP | 04-123680 | 4/1992 |
| JP | 07-203434 | 8/1995 |
| JP | 09-093604 | 4/1997 |
| JP | 10-108195 | 4/1998 |
| JP | 10-276395 | 10/1998 |
| JP | 10-304382 | 11/1998 |
| JP | 2000-201354 | 7/2000 |
| JP | 2001-078201 | 3/2001 |
| JP | 2001-86501 | 3/2001 |

OTHER PUBLICATIONS

Japanese Office Action dated May 9, 2007 with English translation.
United Kingdom Search Report dated Oct. 21, 2003.

* cited by examiner

*Primary Examiner*—Nhon T Diep
(74) *Attorney, Agent, or Firm*—McGinn IP Law Group, PLLC

(57) ABSTRACT

A moving image coding apparatus has a blocking unit for dividing an image applied in units of frames into a plurality of blocks, a mode selection unit for selectively performing intra-frame coding for performing coding within the same frame, and inter-frame prediction coding for performing coding between frames, for each of the plurality of blocks, a self-image display unit for displaying the image, and a qualitative refresh map creation unit for creating a refresh map which sets a shorter refresh period for a block corresponding to a predetermined area on a display screen of the display means than the rest of the plurality of blocks. The mode selection unit performs the intra-frame coding at the refresh period set in the refresh map.

20 Claims, 8 Drawing Sheets

Fig. 5

| BLOCK NUMBER | REFRESH PERIOD | SUBJECTIVE EVALUATION IMPORTANCE LEVEL | INFORMATION |
|---|---|---|---|
| 0 | 120 | 3 (LOW IMPORTANCE) | BACKGROUND DATA |
| 1 | 120 | 3 (LOW IMPORTANCE) | BACKGROUND DATA |
| 2 | 120 | 3 (LOW IMPORTANCE) | BACKGROUND DATA |
| 3 | 60 | 2 (MIDDLE IMPORTANCE) | |
| 4 | 60 | 2 (MIDDLE IMPORTANCE) | |
| ⋮ | ⋮ | | |
| 37 | 15 | 1 (HIGH IMPORTANCE) | EXPRESSION DATA |
| 38 | 15 | 1 (HIGH IMPORTANCE) | EXPRESSION DATA |
| 39 | 15 | 1 (HIGH IMPORTANCE) | EXPRESSION DATA |
| ⋮ | ⋮ | | |
| 97 | 60 | 2 (MIDDLE IMPORTANCE) | |
| 98 | 60 | 2 (MIDDLE IMPORTANCE) | |

APPARATUS AND METHOD FOR CODING MOVING IMAGE

BACKGROUND OF THE INVENTION (1) Field of the Invention

The present invention relates to a moving image coding apparatus and method which are applied to moving images in a videophone, a tele-conference, and the like.

(2) Description of the Related Art

The videophone is subject to transmission constraints such as a low bit rate and an error environment (environment under which data transmissions are highly susceptible to errors). Thus, for improving the image quality, moving image coding typically employed by the videophone involves an appropriate selection of intra-frame coding which utilizes the correlation of adjacent pixel levels within an image for coding, and inter-frame prediction coding which utilizes pixel correlation of a past frame to a current frame for coding, such that suitable coding is applied to each area.

The intra-frame coding is characterized by a high error immunity but a large amount of codes generated therein. On the other hand, the inter-frame prediction coding is characterized by a low error immunity but a reduced amount of codes generated therein. As such, there is a trade-off relationship between a degraded image quality due to transmission errors and a coding efficiency. To cope with this situation, moving images are coded for the videophone on the assumption that:

(1) the inter-frame prediction coding is not basically performed except for the first frame;

(2) the intra-frame coding is performed on a periodic basis for eliminating accumulated errors; and (3) the intra-frame coding is imposed if a certain quantitative condition is satisfied.

FIG. 1 generally illustrates the configuration of a conventional moving image coding apparatus which is employed in the videophone. The illustrated moving image coding apparatus comprises moving image input unit 1; blocking unit 2; discrete cosine transform unit 3; quantization unit 4; code conversion unit 5; de-quantization unit 6, inverse discrete cosine transform unit 7; frame memory 8; predicted image generator unit 9; motion detection unit 10; mode selection unit 11; subtractor 12; two-input, one-output switch 13; adder 14; and refresh map creation unit 800.

Moving image input unit 1 comprises a well known imager such as a CCD camera for capturing a desired image through the imager. Blocking unit 2 divides image data applied from moving image input unit 1 into blocks of m×n pixels (m, n are natural numbers) which are units for coding, and delivers image data (block data) for each block. The output of blocking unit 2 is supplied to one input of subtractor 12, one input of switch 13, and motion detection unit 10, respectively.

Subtractor 12 is also supplied with an output of predicted image generator unit 9 at the other input to subtract the output of predicted image generator unit 9 from the output of blocking unit 2. The output of subtractor 12 is supplied to the other input of switch 13. Switch 13 delivers one of the inputs in response to a control signal from mode selection unit 11. The output of switch 13 is supplied to discrete cosine transform unit 3.

Discrete cosine transform unit 3 applies known discrete cosine transform (DCT) to the output data of switch 13. The output of discrete cosine transform unit 3 is supplied to quantization unit 4. Quantization unit 4 quantizes a DCT coefficient which is the output of discrete cosine transform unit 3.

The output of quantization unit 4 is supplied to code conversion unit 5 and de-quantization unit 6.

Code conversion unit 5 applies known variable length coding to the output data of de-quantization unit 6. Data delivered from code conversion unit 5, which is the output (coded data) of the moving image coding apparatus, is transmitted to a moving image decoding apparatus which is provided in the destination of the image data. De-quantization unit 6 de-quantizes the output data of quantization unit 4. The output of de-quantization unit 6 is supplied to inverse discrete cosine transform unit 7.

Inverse discrete cosine transform unit 7 applies known inverse discrete cosine transform (IDCT) to the output data of de-quantization unit 6. The output of inverse discrete cosine transform unit 7 is supplied to one input of adder 14. Adder 14 is supplied with the output of predicted image generator unit 9 at the other input to deliver the sum of the output of predicted image generator unit 9 and the output of inverse discrete cosine transform unit 7. The output of adder 14 is supplied to frame memory 8.

Frame memory 8, which sequentially stores output data from adder 14, can store one frame of image data. Image data stored in frame memory 8 is supplied to predicted image generator unit 9 and motion detection unit 10. Motion detection unit 10 detects motions from one frame to the next from the block data supplied from blocking unit 2 and the image data supplied from frame memory 8, and supplies the detected result (motion vectors) to predicted image generator unit 9. Motion detection unit 10 further calculates error power between corresponding blocks from the block data from blocking unit 2 and the image data from frame memory 9, and supplies the calculation result to refresh map creation unit 800.

Predicted image generator unit 9 generates a predicted image from the frame data supplied from frame memory 8 and the motion vectors supplied from motion detection unit 10. Refresh map creation unit 800 creates a refresh map, which indicates whether or not a forced refresh (forcedly performed intra-frame coding) should be applied to data in each of blocks divided by blocking unit 2, based on the error power supplied from motion detection unit 10. A forced refresh flag is set only for a block which has the error power higher than a predefined threshold. The refresh map created by refresh map creation unit 800 is supplied to mode selection unit 11.

Mode selection unit 11 controls a switching operation of switch 13 in accordance with the refresh map supplied from refresh map creation unit 800. Specifically, mode selection unit 11 imposes switch 13 to select the output of blocking unit 2 for a block for which the forced refresh flag is set, and imposes switch 13 to select the output of subtractor 12 for a block for which the forced refresh flag is not set. When the output of blocking unit 2 is selected, the intra-frame coding is performed, whereas when the output of subtractor 12 is selected, the inter-frame prediction coding is performed.

Next, specific description will be made on the operation of the moving image coding apparatus described above. The following description on the operation is made on the assumption that image data is applied from image input unit 1 in time series in the order of frame A, frame B, frame C, . . . . Assume also that the refresh map is initialized (the forced refresh flag is not set for any block) at the start of coding (at the time image data of frame A is applied).

As image data of first frame A is applied, blocking unit 2 divides the input image data into a plurality of blocks, and sequentially delivers data of the respective blocks. Since the refresh map is initialized at the time the image data of frame A is applied, switch 13 is controlled by mode selection unit 11 to select the output of blocking unit 2 as it is for all block data. It should be noted that although the output of blocking unit 2 is also supplied to motion detection unit 10, motion detection unit 10 does not detect motion vectors or calculate the error power because frame memory 8 does not store any image data of corresponding past frames.

Each block data delivered from switch 13 is discrete-cosine-transformed by discrete cosine transform unit 3, quantized by quantization unit 4, and then supplied to code conversion unit 5 and de-quantization unit 6, respectively. Code conversion unit 5 performs a code conversion for the quantized data of each block supplied from quantization unit 4. De-quantization unit 6 in turn de-quantizes the quantized data of each block supplied from quantization unit 4. The de-quantized data is inversely discrete-cosine-transformed by inverse discrete cosine transform unit 7 to thereby restore an original image. Then, this restored image is stored in frame memory 8 as a reference frame for use in the coding of image data of the next frame B.

Next, as image data of frame B is applied, blocking unit 2 divides the input image data into a plurality of blocks, and sequentially delivers data of the respective blocks. Subsequently, motion detection unit 10 detects motion vectors and calculates the error power for each block from each block data of the current frame B delivered from blocking unit 2 and each block data of the past frame A stored in frame memory 8. Then, predicted image generator unit 9 generates a predicted image associated with each block from each block data of frame A supplied from frame memory 8 and the motion vectors of each block supplied from motion detection unit 10, while refresh map creation unit 800 creates a refresh map related to each block data of frame B divided by blocking unit 2 based on the error power supplied from motion detection unit 10.

As refresh map creation unit 800 creates the refresh map, mode selection unit 11 controls switch 13 to select one of the inputs in accordance with the created refresh map. Switch 13 selects the output of blocking unit 2 for a block for which the forced refresh flag is set, and selects the output of subtractor 12 (which is generated by subtracting the predicted image generated by predicted image generator unit 9 from the output of blocking unit 2) for a block for which the forced refresh flag is not set.

Each block data delivered from switch 13 is discrete-cosine-transformed by discrete cosine transform unit 13, quantized by quantization unit 4, and then supplied to code conversion unit 5 and de-quantization unit 6, respectively. Code conversion unit 5 performs a code conversion for the quantized data of each block supplied from quantization unit 4. De-quantization unit 6 in turn de-quantizes the quantized data of each block supplied from quantization unit 4. The de-quantized data is inversely discrete-cosine-transformed by inverse discrete cosine transform unit 7, and added to the predicted image generated by predicted image generator unit 9, thereby restoring an original image (frame B). Then, this restored image is stored in frame memory 8 as a reference frame for use in the coding of image data of the next frame C.

Likewise, for image data of frame C, a refresh map is created in a similar procedure to frame B as mentioned above, and switch 13 is imposed to switch the inputs for each block in accordance with the created refresh map.

Other than the moving image coding apparatus described above, there is a moving image coding apparatus as described in JP-A-2000-201354. This moving image coding apparatus creates a refresh map which gives a priority for refreshing to each block of input image data. Intra-frame coding and inter-frame prediction coding are switched in accordance with the refresh map. Specifically, the moving image coding apparatus involves refreshing a block with a higher priority at a shorter period (at which the intra-frame coding is performed), and refreshing a block with a lower priority at a longer period.

The priority for refreshing is determined by calculating a block feature amount (importance in improvement on image quality), which represents the proportion in which each block of input image data includes visually important information such as contours, or the degree at which a degraded image quality is subjectively perceivable (subjective evaluation importance level), and comparing the block feature amount with a preset threshold. The block feature amount may be represented by an amount indicative of the power of edge components produced by image processing which uses, for example, a high pass filter and another edge extraction filter.

However, the conventional moving image coding apparatuses described above imply the following problems, respectively.

In a part having a high subjective evaluation importance level, for example, in a part which forms expressions such as eyes, nose, mouth and the like, a degraded image quality is subjectively more perceivable. To provide an image having a high subjective evaluation, it is necessary to refresh a part having a high subjective evaluation importance level at a shorter period to prevent the characteristics of coding from degrading. In the moving image coding apparatus illustrated in FIG. 1, the determination as to whether or not refreshing is performed is collectively made for all blocks, so that this coding apparatus fails to provide an image quality having a high subjective evaluation, though a quantitative improvement can be expected on the image quality.

The moving image coding apparatus described in JP-A-2000-201354 must detect edge components with the aid of a high pass filter and another edge extraction filter to calculate the power. This moving image coding apparatus is disadvantageous in complicated image processing involved in the detection of edge components and a higher cost due to the filter used for detecting edges.

SUMMARY OF THE INVENTION

It is an object of the present invention to provide an inexpensive moving image coding apparatus and method which are capable of simply achieving an image quality having a high subjective evaluation.

To achieve the above object, a moving image coding apparatus according to the present invention includes blocking means for dividing an image applied in units of frames into a plurality of blocks, selecting means for selectively performing intra-frame coding for performing coding within the same frame, and inter-frame prediction coding for performing coding between frames, for each of the plurality of blocks, display means for displaying the image, and qualitative refresh map creating means for creating a refresh map which sets a shorter refresh period at which the intra-frame coding is performed at a constant frame period for a block corresponding to a predetermined area on a display screen of the display means than the rest of the plurality of blocks, wherein the selecting means is configured to perform the intra-frame coding at the refresh period set in the refresh map.

In the moving image coding apparatus described above, the display means may have a mark for limiting the range of the predetermined area on the display screen. The mark may limit an area for displaying a part or entirety of an object included in the image.

The moving image coding apparatus may further include changing means for changing the range limited by the mark, wherein the qualitative refresh map creating means may create a refresh map which sets a shorter refresh period for a block corresponding to the area limited by the mark and changed by the changing means than the rest of the plurality of blocks.

A moving image coding method according to the present invention includes the steps of dividing an image applied in units of frames into a plurality of blocks, displaying the image on a display screen, selectively performing intra-frame coding for performing coding within the same frame, and inter-frame prediction coding for performing coding between frames, for each of the plurality of blocks, creating a refresh map which sets a shorter refresh period at which the intra-frame coding is performed at a constant frame period for a block corresponding to a predetermined area on a display screen of the display means than the rest of the plurality of blocks, and performing the intra-frame coding at the refresh period set in the refresh map.

In the moving image coding method described above, a mark may be displayed on the display screen for limiting the predetermined area. The mark may limit an area for displaying a part or entirety of an object included in the image.

The moving image coding method may further include the step of changing the range limited by the mark, wherein the step of creating a refresh map may include creating a refresh map which sets a shorter refresh period for a block corresponding to the area limited by the mark and changed by the changing means than the rest of the plurality of blocks.

As appreciated from the foregoing, in the present invention, a block corresponding to a predetermined area on the display screen is refreshed at a period shorter than the rest of blocks. Therefore, if a part of an input image, for example, eyes, nose and the like, having a high subjective evaluation importance level is positioned within the predetermined area on the display screen at all times, the block corresponding to the part having a high subjective evaluation importance level is refreshed at a shorter period than the rest of blocks, and the resulting image presents a high subjective evaluation. This procedure does not require a filter or image processing for extracting edge components, as has been performed in the prior art.

In the present invention, when the mark is provided on the display screen, the mark limits the area for displaying a part or entirety of the object, so that a part of an input image having a high subjective evaluation importance level, such as eyes, nose and the like, is readily positioned within the predetermined area on the display screen at all times.

The above and other objects, features, and advantages of the present invention will become apparent from the following description with reference to the accompanying drawings which illustrate examples of the present invention.

BRIEF DESCRIPTION OF THE DRAWINGS

In the accompanying drawings:

FIG. 5 is a schematic diagram illustrating an example of a refresh period table shown in FIG. 4;

DESCRIPTION OF THE PREFERRED EMBODIMENTS

Next, embodiments of the present invention will be described with reference to the accompanying drawings.

First Embodiment

Figure 1:
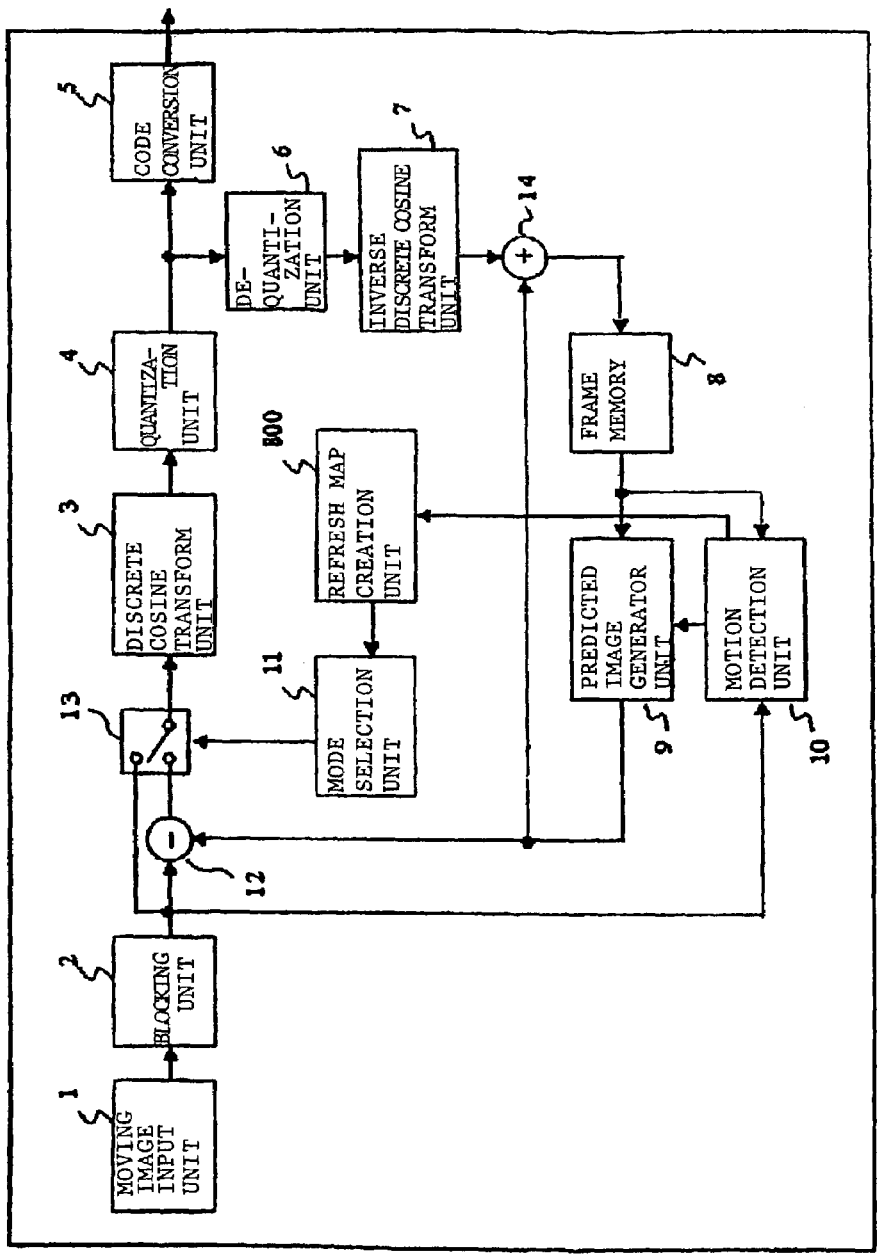
FIG. 1 is a block diagram generally illustrating the configuration of a conventional moving image coding apparatus.
Figure 2:
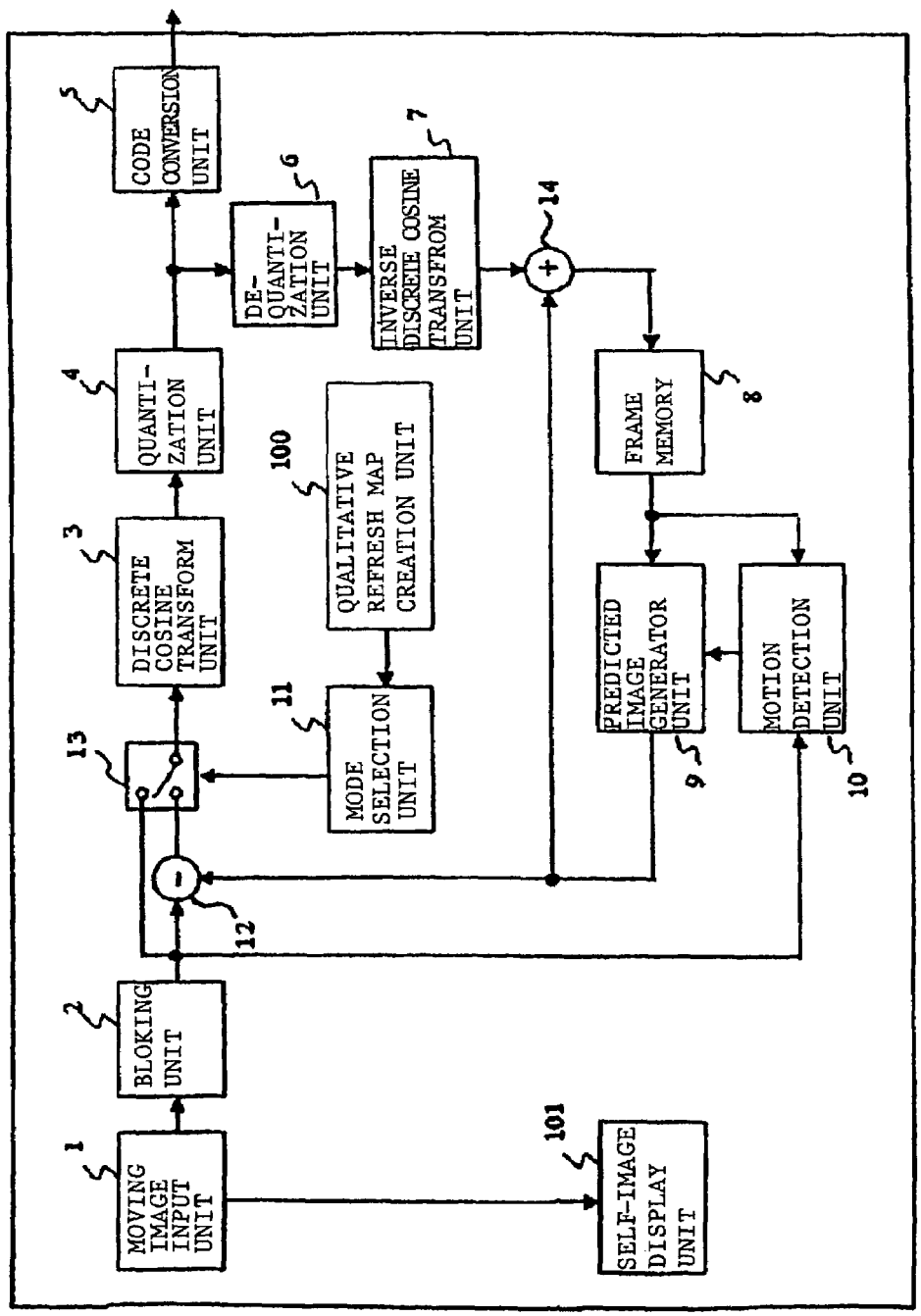
FIG. 2 is a block diagram generally illustrating the configuration of a moving image coding apparatus according to a first embodiment of the present invention.

FIG. 2 generally illustrates the configuration of a moving image coding apparatus according to a first embodiment of the present invention. This moving image coding apparatus is substantially similar in configuration to the counterpart illustrated in FIG. 1 except that qualitative refresh map creation unit 100 is substituted for refresh map creation unit 800, and self-image display unit 101 is additionally provided. In FIG. 2, the same parts as those in FIG. 1 are designated the same reference numerals. For simplifying the description, the operation of the same parts is omitted in the following discussion.

Self-image display unit 101 comprises a display device, for example, LCD (liquid crystal display) for displaying image data applied from moving image input unit 1. Self-image display unit 101 is configured to display a mark on a display screen for limiting an area in which an object can be displayed, so that a block having a high subjective evaluation importance level can be distinguished from a block having a low subjective evaluation importance level with reference to the mark (estimation of qualitative information). The mark is displayed based on previously prepared image data for the mark, and the mark is displayed on the display screen at all times at least when an image is being captured by moving image input unit 1. The user may adjust imaging conditions (for example, the distance between the imager camera and object, and their positional relationship) in moving image input unit 1 such that a determined part of the object is fitted within the mark on the display screen in a proper size.

Figure 3:
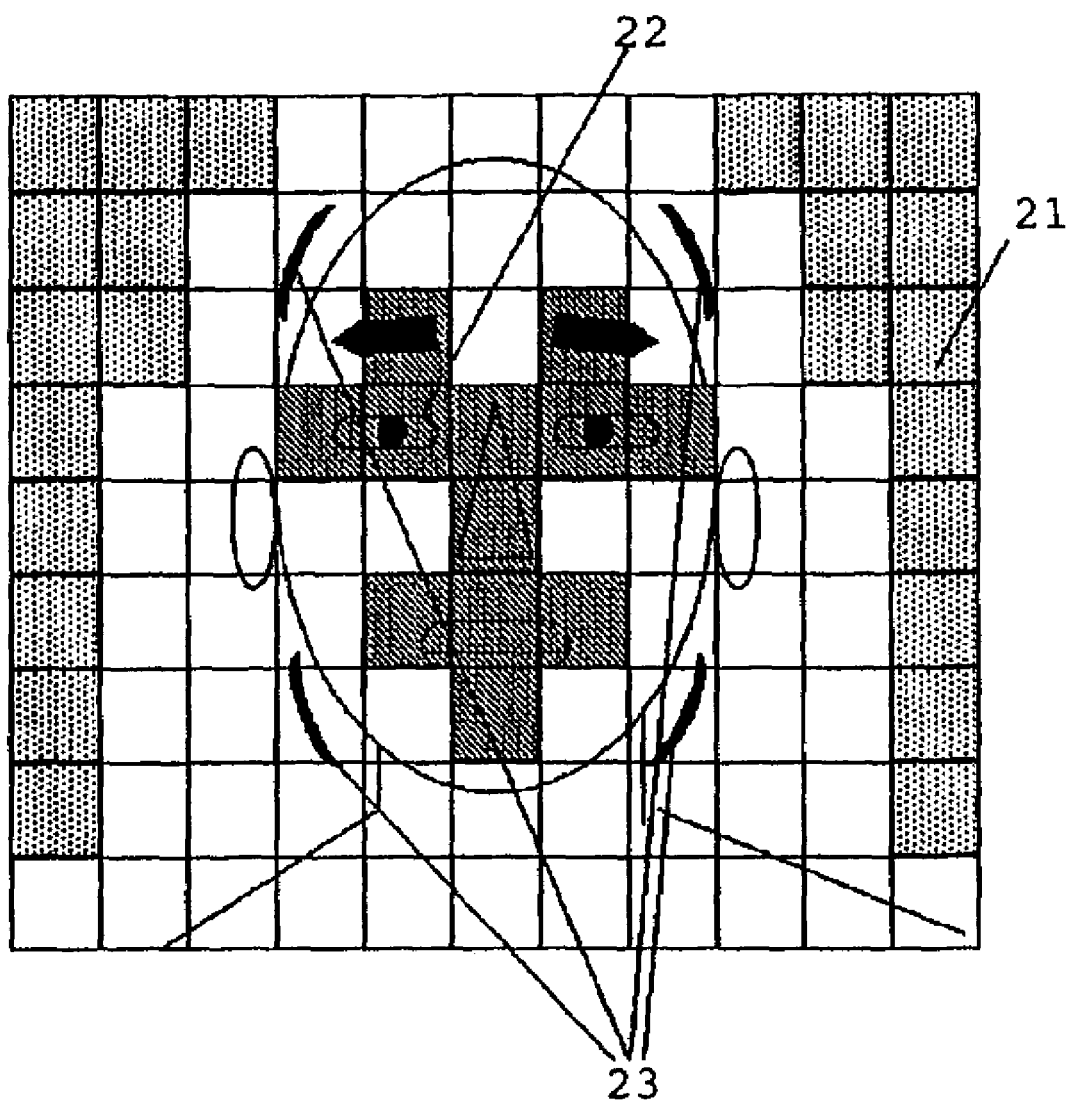
FIG. 3 is a schematic diagram illustrating an example of a mark, a displayed image and qualitative information.

FIG. 3 illustrates an example of the mark, displayed image and qualitative information. The mark, which is applied to a person's image above shoulders, as often viewed in images of videophones, is made up of four arcuate lines 23 which limit an area in which the head of a person, i.e., the object, is displayed. For lines 23 are positioned on a diagonal line. The area for lines 23 is positioned substantially at the center of display screen 20. When the head of the person, i.e., the object, is fitted within the mark in a proper size on display screen 20, parts which make up expressions such as the eyes, nose, mouth, eyebrows and the like (parts having a high subjective evaluation importance level) are always included in the predetermined area defined by the mark, whereas the area out of the mark forms the background (an area having a low subjective evaluation importance level) without fail. Making use of this strategy, the qualitative information can be estimated. The qualitative information is made up of three components: background blocks 21 each having a low subjective evaluation importance level, expression making blocks 22 each having a high subjective evaluation importance level, and the remaining blocks.

Qualitative refresh map creation unit 100 creates a refresh map based on the qualitative information. Specifically, qualitative refresh map creation unit 100 creates a refresh map for a plurality of blocks divided by blocking unit 2, which sets a shorter refresh period (at which the intra-frame coding is performed) for a predetermined area within the mark on the display screen, i.e., for expression making blocks 22 corresponding to a part having a high subjective evaluation importance level than the remaining blocks (those having a low subjective evaluation importance level including background blocks 21).

Figure 4:
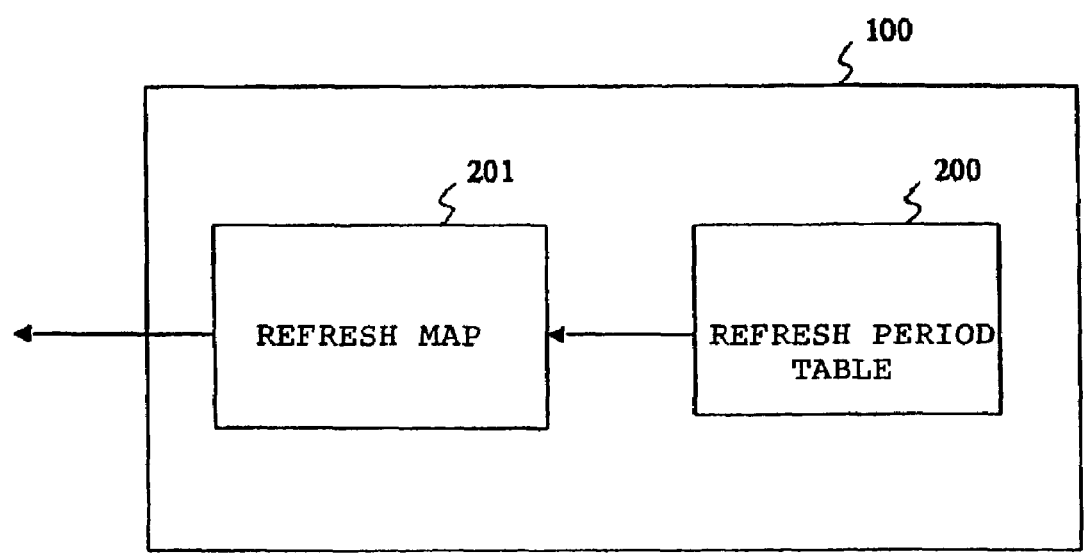
FIG. 4 is a block diagram illustrating an exemplary configuration of a qualitative refresh map creation unit shown in FIG. 2.

FIG. 4 illustrates an exemplary configuration of qualitative refresh map creation unit 100. This qualitative refresh map creation unit 100 comprises refresh period table 200 which previously sets a refresh period for each of a plurality of blocks divided by blocking unit 2; and refresh map 201 which is created based on the values of refresh periods held in refresh period table 200.

FIG. 5 shows an example of refresh period table 200. Refresh period table 200 stores a refresh period for each block number. Block numbers 0-98 correspond to respective blocks divided by blocking unit 2, respectively. Several subjective evaluation importance levels are set from block layout information (background, expression and the like), and the refresh periods are set based on the levels. In the shown example, block number 0-2 correspond to background blocks 21, for which 120 is stored as the refresh period. Block numbers 37-39 correspond to expression making blocks 22, for which 15 is stored as the refresh period. Block numbers 3, 4, 97, 98 correspond to the remaining blocks, for which 60 is stored as the refresh period. Subjective evaluation importance levels have three levels: "1 (high importance)," "2 (middle importance)," and "3 (low importance)," which correspond to expression data, other data and background data, respectively. The values of the refresh periods stored in refresh period table 200 are copied to refresh map 201 for the respective blocks.

The values stored in refresh map 201 are each decremented each time a frame is processed. Specifically, the value of 120 stored in refresh map 201 for a block upon processing of an n-th frame is decremented to 119 when the (n+1)th frame is processed; to 118 when the (n+2)th frame is processed; and to zero when the (n+120)th frame is processed. Mode selection unit 11 controls switch 13 to switch the inputs in accordance with the value stored in refresh map 201, specifically, whether or not this value is zero. When the value is zero, the intra-frame coding is applied to an associated block, and otherwise, the inter-frame prediction coding is applied. For a block associated with the value of zero stored in refresh map 201, the refresh period stored in refresh period table 200 is copied to refresh map 201 before the next frame is processed. Therefore, in this example, the value on the refresh map is again decremented in such a manner that the value is set to 120 at the (n+121)th frame, and then is decremented to 119 at the (n+122)th frame. In this way, the refreshing is performed at the refresh period stored in refresh table 200. Specifically, background blocks 21 are each assigned a refresh period set at 120, so that background blocks 21 are refreshed every 120 frames with the output of blocking unit 2 selected by switch 13. For expression making blocks 22, which are each assigned a refresh period set at 15, are refreshed every 15 frames with the output of blocking unit 2 selected by switch 13. For the remaining blocks, which are assigned the refresh period set at 60, are refreshed every 60 frames with the output of blocking unit 2 selected by switch 13.

Next, specific description will be made on the operation of the moving image coding apparatus according to the foregoing embodiment. A use scenario assumed in the following description is such that the distance between an object and a camera of moving image input unit 1 is limited in a point-to-point videophone session, for example, with portable telephones.

As the object (user) is imaged by the camera of moving image input unit 1, self-image display unit 101 displays the user's self-image. The user adjusts the distance from the camera, and the positional relationship between them such that the head is fitted within the mark on the display screen of self-image display unit 101 in a proper size.

As the head is fitted within the mark in a proper size, the user next performs predetermined manipulations for initiating a videophone. As the videophone is initiated, qualitative refresh map creation unit 100 initializes the values of all refresh periods in refresh map 201 to zero.

After the initialization, as image data of the first frame is applied from moving image input unit 1, blocking unit 2 divides the input video data into a plurality of blocks, and sequentially delivers respective block data. At this time, since the refresh periods in refresh map 201 are initialized to zero, switch 13 is controlled by mode selection unit 11 to select the output of blocking unit 2 as it is for all block data for performing the intra-frame coding. After the refreshing, in qualitative refresh map creation unit 100, all the values in refresh period table 200 are copied to refresh map 201. Assume herein that the values of refresh periods in refresh period table 200 shown in FIG. 5 are copied to refresh map 201.

As image data of the second frame is applied from moving image input unit 1, blocking unit 2 divides the input video data into a plurality of blocks, and sequentially delivers respective block data. At this time, refresh map 201 has stored 120 set to the refresh period for background blocks 21; 15 set to the refresh period for expression making blocks 22, and 60 set to the refresh period for the remaining blocks. Mode selection unit 11 imposes switch 13 to select the output of subtractor 12 for all block data for performing the inter-frame prediction coding. Subsequently, qualitative refresh map creation unit 100 decrements by one the values of the respective refresh periods for background blocks 21, expression making blocks 22 and remaining blocks, stored in refresh map 201.

As image data of the third frame is applied from moving image input unit 1, blocking unit 2 divides the input image data into a plurality of blocks, and sequentially delivers respective block data. At this time, refresh map 201 has stored 199 set to the refresh period for background blocks 21; 14 set to the refresh period for expression making blocks 22; and 59 set to the refresh period for the remaining blocks. Mode selection unit 11 imposes switch 13 to select the output of subtractor 12 for all block data for performing the inter-frame prediction coding. Subsequently, qualitative refresh map creation unit 100 decrements by one the values of the respective refresh periods for background blocks 21, expression making blocks 22 and remaining blocks, stored in refresh map 201.

For the fourth to 16th frames, similar processing is performed as is the case with the foregoing second and third frames.

As image data of the 17th frame is applied from moving image input unit 1, blocking unit 2 divides the input image data into a plurality of blocks, and sequentially delivers respective block data. At the time the 16th frame has been processed, refresh map 201 has stored 185 set to the refresh period of background blocks 21; zero set to the refresh period of expression making blocks 22, and 45 set to the refresh period for the remaining blocks. Mode selection unit 11 imposes switch 13 to select the output of blocking unit 2 as it is for expression making blocks 22 for performing the intra-frame coding and to select the output of subtractor 12 for background blocks 21 and remaining blocks for performing the inter-frame prediction coding. Subsequently, qualitative refresh map creation unit 100 decrements by one the values of the respective refresh periods for background blocks 21 and remaining blocks stored in refresh map 201, and copies the value of the refresh period, set at 15, in refresh period table 200, to the value of the refresh period for expression making blocks 22.

In the manner described above, as the value of the refresh period reaches zero in refresh map 201, an associated block is refreshed. After the refreshing, the value of the refresh period is reset to the value of the refresh period for the associated block in refresh period table 200. With this operation, expression making blocks 22 are each refreshed every 15 frames, background blocks 21 are each refreshed every 120 frames, and the remaining blocks 60 are each refreshed every 60 frames.

As described above, the moving image coding apparatus according to the first embodiment can simply extract parts having a high subjective evaluation importance level such as eyes, nose and the like, without using a filter or image processing for extracting edge components. In addition, since the refresh period is set shorter for blocks corresponding to parts having a high subjective evaluation importance level than the remaining blocks, it is possible to provide an image with a high subjective evaluation.

Second Embodiment

Figure 6:
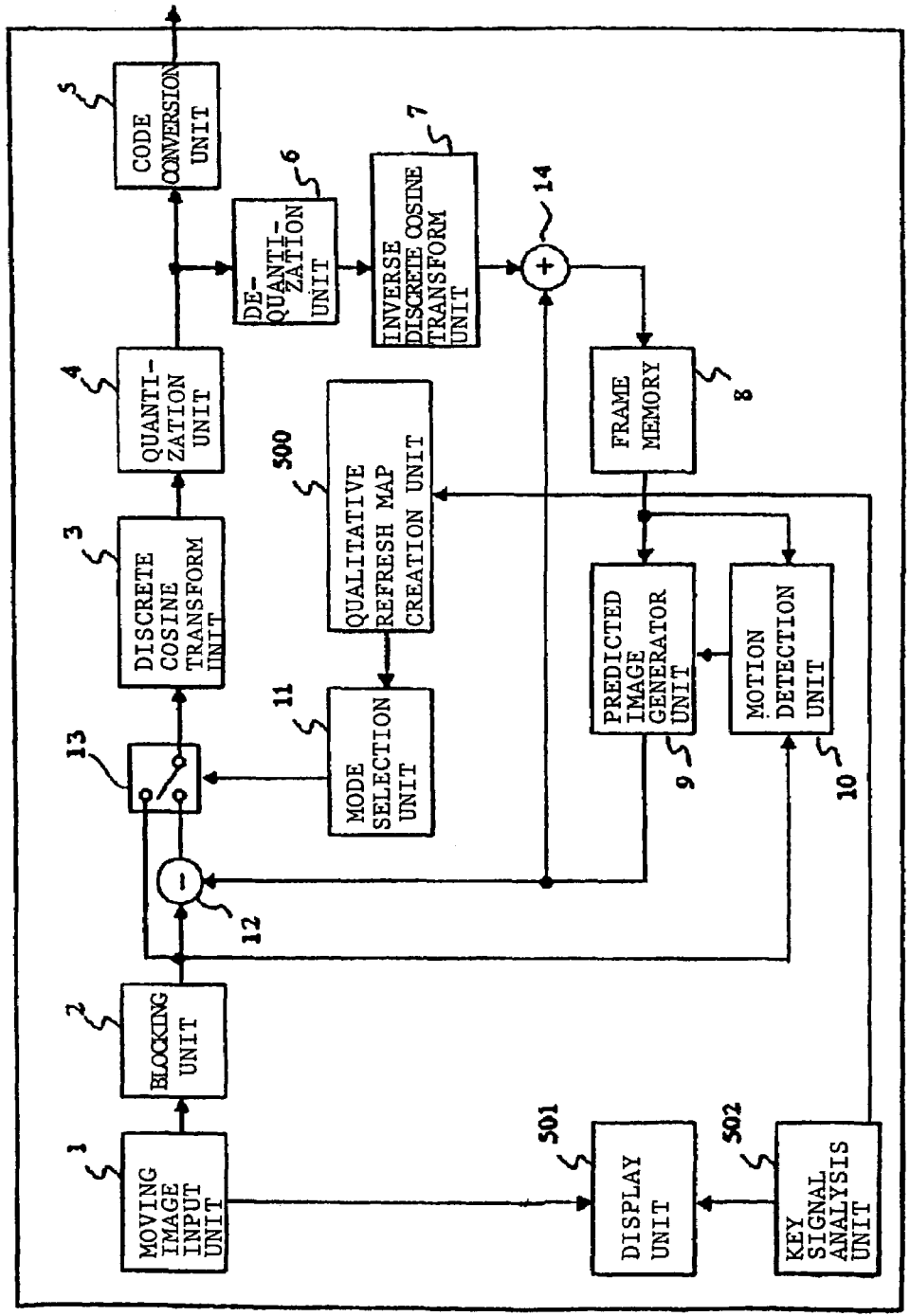
FIG. 6 is a block diagram generally illustrating the configuration of a moving image coding apparatus according to a second embodiment of the present invention.

FIG. 6 is a block diagram generally illustrating the configuration of a moving image coding apparatus according to a second embodiment of the present invention. The moving image coding apparatus according to the second embodiment is substantially similar in configuration to the counterpart illustrated in FIG. 2 except that display unit 501, key signal analysis unit 502 and qualitative refresh map creation unit 500 are provided instead of self-image display unit 101 and qualitative refresh map creation unit 100. In FIG. 6, the same parts as those in FIG. 2 are designated the same reference numerals. For simplifying the description, the operation of the same parts is omitted in the following discussion.

Display unit 501, which comprises a display device such as LCD, by way of example, displays image data applied from moving image input unit 1. Display unit 501 is configured to display a mark on a display screen for limiting an area in which an object can be displayed, so that blocks having a high subjective evaluation importance level can be distinguished from blocks having a low subjective evaluation importance level with reference to the mark (estimation of qualitative information). The mark is displayed based on previously prepared image data for the mark, and the mark is displayed on the display screen at all times at least when an image is being captured by moving image input unit 1. The user may adjust imaging conditions (for example, the distance between the imager camera and object, and their positional relationship) in moving image input unit 1 such that a determined part of the object is fitted within the mark on the display screen in a proper size.

Figure 7:
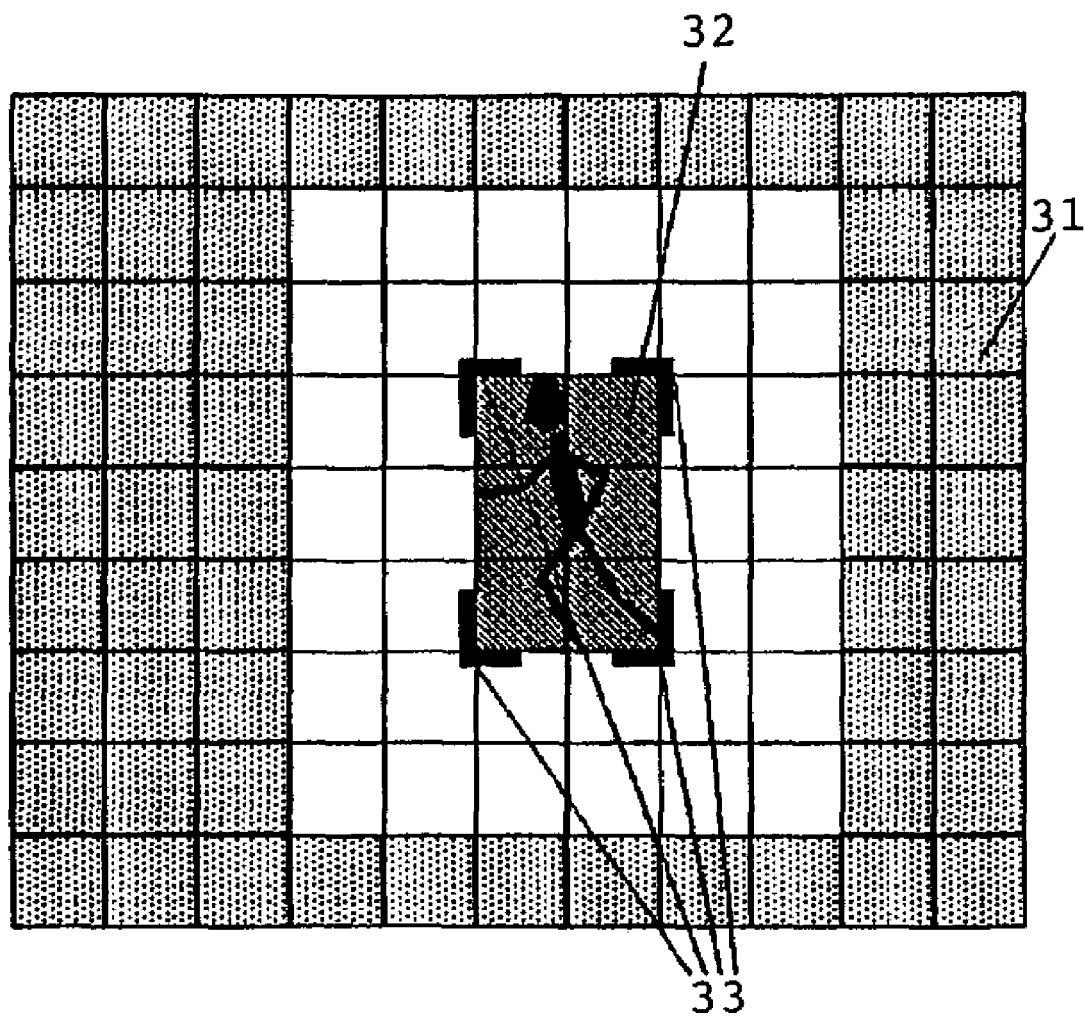
FIG. 7 is a schematic diagram illustrating an example of a mark, a displayed image and qualitative information.

FIG. 7 illustrates an example of the mark, displayed image and qualitative information. The mark is made up of four coronoid lines 33 for limiting an area in which a person or object is displayed. Four lines 43 are diagonally positioned and can be set at desired locations on display screen 30. When the person or object is fitted within the mark in a proper size on display screen 30, the part of the person or object, which has a high subjective evaluation importance level, is always included within the mark, whereas the area out of the mark forms the background which has a low subjective evaluation importance level, without fail. Making use of this strategy, the qualitative information can be estimated. The qualitative information is made up of three components: background blocks 31, object making blocks 32, and remaining blocks.

The user can move the mark and scale up and down the mark on the display screen through predetermined input manipulations on a key input device, not shown. For example, the key input device comprises a direction key for moving the mark on the display screen, such that the user can move the mark in a desired direction with the direction key. The direction key is, for example, similar to a cross key on a portable telephone. Scaling up/down can also be made through the direction key.

Display unit 501 also displays a normal mode for displaying the mark at a normal position predetermined, a move mode for moving the mark, and a scale up/down mode for scaling up/down the mark in the form of button, such that the user can select any of these modes by performing an input manipulation on the key input device. It should be noted that the normal mode is selected by default upon power-on to display the mark at the normal position on the display screen.

Key signal analysis unit 502 analyzes an input manipulation on the key input device. For example, when the user selects the move mode and depresses the direction key through input manipulations on the key input device, the key input device supplies key signal analysis unit 502 with a key signal which has information indicating in which direction the direction key is depressed by which amount. Key signal analysis unit 502 analyzes the key signal supplied thereto to determine a moving direction and calculates a moving amount of the mark on the display screen. When the user selects the scale up/down mode, the key input device supplies key signal analysis unit 502 with a key signal which includes information indicating how much the mark is scaled up or down. Key signal analysis unit 502 analyzes the key signal supplied thereto to calculate the amount by which the mark is scaled up or down on the display screen. In either case, the calculation result is supplied to qualitative refresh map creation unit 500.

Qualitative refresh map creation unit 500 creates a refresh map based on the qualitative information. Specifically, qualitative refresh map creation unit 500 creates a refresh map for a plurality of blocks divided by blocking unit 2, which sets a shorter refresh period for the area within the mark on the display screen, i.e., for object making blocks 32 corresponding to parts having a high subjective evaluation importance level than the remaining blocks (those having a low subjective evaluation importance level including background blocks 31).

When the user moves the mark and scales up or down the mark through input manipulations on the key input device, qualitative refresh map creation unit 500 creates a refresh map by estimating qualitative information based on a calculation result supplied from key signal analysis unit 502.

Figure 8:
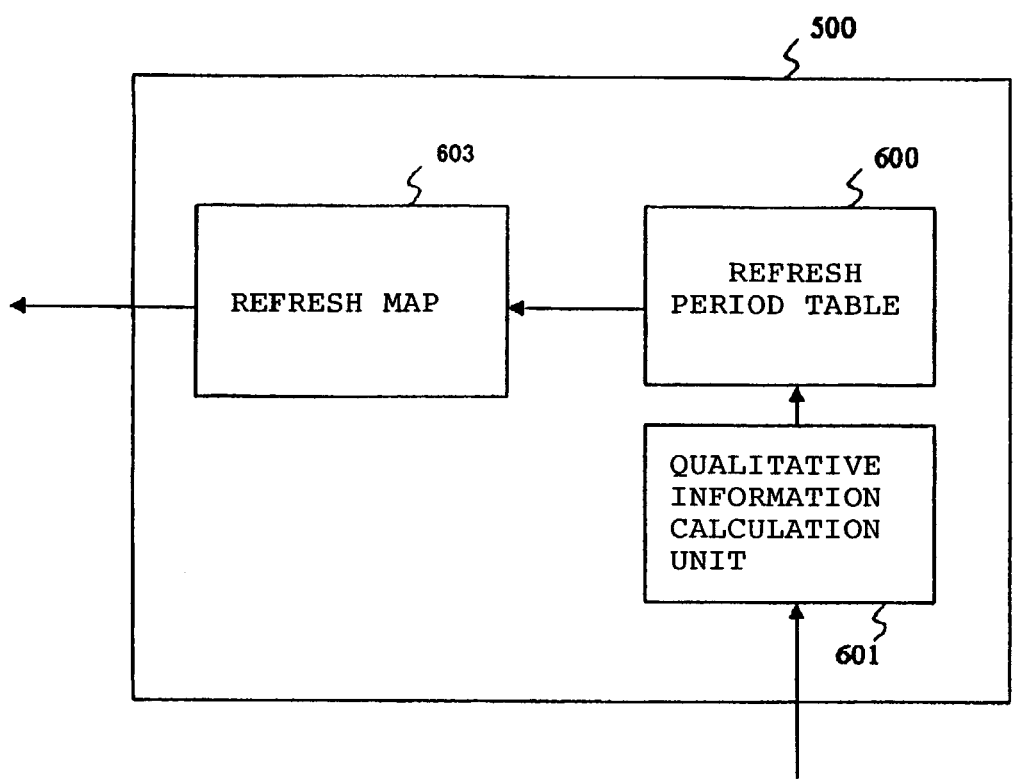
FIG. 8 is a block diagram illustrating an exemplary configuration of a qualitative refresh map creation unit shown in FIG. 6.

FIG. 8 illustrates an exemplary configuration of qualitative refresh map creation unit 500. This qualitative refresh map creation unit 500 comprises refresh period table 600, qualitative information calculation unit 602, and refresh map 603. Qualitative information calculation unit 601 finds the position of the current mark after it has been moved and/or scaled up or down based on a calculation result supplied from key signal analysis unit 502, and calculates qualitative information for each block from a relative position from the mark.

Refresh period table 600 stores a refresh period for each block number corresponding to each block based on the qualitative information calculated by qualitative information calculation unit 601. Object making blocks 32 are each refreshed at a shorter period than the other blocks (background blocks 31 and remaining blocks). Refresh map 603 is created based on the values of the refresh periods stored in refresh period table 600.

In the moving image coding apparatus according to the second embodiment, mode selection unit 11 controls switch 13 to switch the inputs in accordance with the value stored in refresh map 603, specifically, whether or not the value is zero. The intra-frame coding is applied to an associated block when the value is zero, while the inter-frame prediction coding is applied when it is not zero. For example, when refresh period table 600 has stored such values as 120 set to the refresh period for background blocks 31, 15 set to the refresh period for object making blocks 32, and 60 set to the refresh period for the remaining blocks, mode selection unit 11 imposes switch 13 to select the output of blocking unit 2 every 120 frames for background blocks 31; every 15 frames for object making blocks 32; and every 60 frames for the remaining blocks. A specific procedure of the refresh operation is similar to that in the aforementioned first embodiment, so that description thereon is omitted here.

The foregoing values of the refresh periods in refresh map 603 are exemplary and can be set as appropriate. For example, values set in refresh map 603 may be 200 as the refresh period for background blocks 31; 15 for object making blocks 32; and 60 for the remaining blocks. In this event, mode selection unit 11 imposes switch 13 to select the output of blocking unit 2 every 200 frames for background blocks 31; every 15 blocks for object making blocks 32; and every 60 frames for the remaining blocks.

In the respective embodiments described above, the intra-frame coding refers to coding within the same frame, and includes intra-field prediction and inter-field prediction.

While the respective embodiments described above are basically applied to moving images for communications such as the videophone, tele-conference and the like, they may be applied as well to other moving images, for example, moving images for broadcasting as long as the intra-frame coding and inter-frame prediction coding are selected in units of blocks.

As described above, according to the present invention, the block refresh priority is determined from a qualitative viewpoint, wherein a block which holds important information for subjective evaluation is refreshed at a higher frequency, while a block which holds trivial information for subjective evaluation is refreshed at a lower frequency, so that if coding data is damaged (coding characteristics are degraded) due to errors, a reduction in subjective evaluation can be effectively suppressed for the image quality of a restored image.

In addition, since the present invention eliminates a filter or image processing for extracting edge components as required before, the processing can be simplified, with a resulting reduction in cost, as compared with the prior art.

While preferred embodiments of the present invention have been described using specific terms, such description is for illustrative purposes only, and it is to be understood that changes and variations may be made without departing from the spirit or scope of the following claims.

The invention claimed is:

1. A moving image coding apparatus, comprising:
   blocking means for dividing an image applied in units of frames into a plurality of blocks;
   selecting means for selectively performing an intra-frame coding for performing coding within a same frame, and an inter-frame prediction coding for performing a coding between frames, for each of the plurality of blocks;
   display means for displaying the image; and
   qualitative refresh map creating means for creating a refresh map which sets a shorter refresh period at which the intra-frame coding is performed at a constant frame period for a block corresponding to a predetermined area on a display screen of said display means than for a rest of the plurality of blocks,
   said selecting means configured to perform the intra-frame coding at the refresh period set in said refresh map,
   said display means permitting a user whose image is being presented to view the user's own image in order to make adjustments to a location of said user's image on said display means.

2. The moving image coding apparatus according to claim 1, wherein said display means comprises a mark for limiting a range of the predetermined area on the display screen.

3. The moving image coding apparatus according to claim 2, wherein said mark limits an area for displaying one of a part and an entirety of an object included in the image.

4. The moving image coding apparatus according to claim 2, further comprising:
   changing means for changing the range limited by said mark, wherein said qualitative refresh map creating means creates a refresh map which sets a shorter refresh period for a block corresponding to the predetermined area limited by said mark and changed by said changing means than the rest of the plurality of blocks.

5. A moving image coding method, comprising:
   dividing an image applied in units of frames into a plurality of blocks;
   displaying the image on a display screen, said display means permitting a user whose image is being presented to view the user's own image so as to make adjustments to a location of said user's image on said display means;
   selectively performing an intra-frame coding for performing a coding within a same frame, and an inter-frame prediction coding for performing a coding between frames, for each of the plurality of blocks;
   creating a refresh map which sets a shorter refresh period at which the intra-frame coding is performed at a constant frame period for a block corresponding to a predetermined area on said display screen than for a rest of said plurality of blocks; and
   performing the intra-frame coding at the refresh period set in said refresh map.

6. The moving image coding method according to claim 5, wherein a mark is displayed on said display screen for limiting the predetermined area.

7. The moving image coding method according to claim 6, wherein said mark limits an area for displaying one of a part and an entirety of an object included in the image.

8. The moving image coding method according to claim 6, further comprising:
   changing a range limited by said mark,
   wherein said creating a refresh map includes creating a refresh map which sets a shorter refresh period for a block corresponding to the predetermined area limited by said mark and changed by said changing than the rest of the plurality of blocks.

9. The moving image coding apparatus according to claim 2, wherein said mark comprises four arcuate lines.

10. The moving image coding method according to claim 6, wherein said mark comprises four arcuate lines.

11. The moving image coding apparatus according to claim 9, wherein said four arcuate lines correspond to an area in which a head of a user is to be framed.

12. The moving image coding method according to claim 10, wherein said four arcuate lines correspond to an area in which a head of a user is to be framed.

13. The moving image coding apparatus according to claim 1, wherein said block corresponding to said predetermined area on said display screen of said display means comprises an expression marking block.

14. The moving image coding method according to claim 5, wherein said block corresponding to said predetermined area on said display screen of said display means comprises an expression marking block.

15. The moving image coding apparatus according to claim 1, wherein a value of said refresh period of said refresh map is based on qualitative information selected from one of:
   background blocks of said plurality of blocks having a low subjective evaluation importance level;
   expression marking blocks of said plurality of blocks having a high subjective evaluation importance level; and
   remaining blocks of said plurality of blocks having a middle subjective evaluation inportance level.

16. The moving image coding method according to claim 5, wherein a value of said refresh period of said refresh map is based on qualitative information selected from one of:
   background blocks of said plurality of blocks having a low subjective evaluation importance level;
   expression marking blocks of said plurality of blocks having a high subjective evaluation importance level; and
   remaining blocks of said plurality of blocks having a middle subjective evaluation importance level.

17. The moving image coding apparatus according to claim 15, wherein said refresh period corresponds to at least one of said subjective evaluation importance levels, and said subjective evaluation importance levels are stored in said refresh map.

18. The moving image coding method according to claim 16, wherein said refresh period corresponds to at least one of said subjective evaluation importance levels, and said subjective evaluation importance levels are stored in said refresh map.

19. A moving image coding apparatus, comprising:
   a blocking unit that divides an image applied in units of frames into a plurality of blocks;
   a selecting unit that selectively performs an intra-frame coding for performing a coding within the same frame, and an inter-frame prediction coding for performing a coding between frames, for each of said plurality of blocks;
   a display screen that displays the image, said display means pennitting a user whose image is being presented to view the user's own image so as to make adjustments to a location of said user's image on said display means; and
   a refresh map creation unit which sets a shorter refresh period at which the intra-frame coding is performed at a constant frame period for a block corresponding to a predetermined area on said display screen than for a rest of the plurality of blocks, wherein said selecting unit performs the intra-frame coding at the refresh period set in said refresh map.

20. The moving image coding apparatus according to claim 19, wherein a value of said refresh period of said refresh map is based on qualitative information selected from one of:
   background blocks of said plurality of blocks having a low subjective evaluation importance level outside of said predetermined area on said display screen;
   expression marking blocks of said plurality of blocks having a high subjective evaluation importance level inside of said predetermined area on said display screen; and
   remaining blocks of said plurality of blocks having a middle subjective evaluation importance level.

* * * * *